United States Patent
Sudarsky et al.

(10) Patent No.: US 12,106,469 B2
(45) Date of Patent: Oct. 1, 2024

(54) IMAGE QUALITY ASSESSMENT FOR REFINEMENT OF IMAGING RENDERING PARAMETERS FOR RENDERING MEDICAL IMAGES

(71) Applicant: SIEMENS HEALTHINEERS AG, Forchheim (DE)

(72) Inventors: Sandra Sudarsky, Bedminster, NJ (US); Kaloian Petkov, Lawrenceville, NJ (US); Daphne Yu, Yardley, PA (US)

(73) Assignee: Siemens Healthineers AG, Forchheim (DE)

( * ) Notice: Subject to any disclaimer, the term of this patent is extended or adjusted under 35 U.S.C. 154(b) by 362 days.

(21) Appl. No.: 17/653,516

(22) Filed: Mar. 4, 2022

(65) Prior Publication Data
US 2023/0281789 A1 Sep. 7, 2023

(51) Int. Cl.
*G06T 7/00* (2017.01)
*G06F 18/214* (2023.01)
*G06T 1/60* (2006.01)
*G06T 5/50* (2006.01)
*G06T 7/50* (2017.01)

(52) U.S. Cl.
CPC ............ *G06T 7/001* (2013.01); *G06F 18/214* (2023.01); *G06T 1/60* (2013.01); *G06T 5/50* (2013.01); *G06T 7/50* (2017.01); *G06T 2207/20081* (2013.01); *G06T 2207/30004* (2013.01); *G06T 2207/30168* (2013.01)

(58) Field of Classification Search
CPC .. G06T 7/001; G06T 1/60; G06T 5/50; G06T 7/50; G06T 2207/20081; G06T 2207/30004; G06T 2207/30168; G06T 7/0002; G06T 7/0012; G06T 2207/20084; G06F 18/214
USPC .......................................................... 382/128
See application file for complete search history.

(56) References Cited

U.S. PATENT DOCUMENTS

| | | | |
|---|---|---|---|
| 10,424,045 B2 * | 9/2019 | Park ........................ | G06T 7/344 |
| 2018/0144214 A1 * | 5/2018 | Hsieh .................... | G06T 7/0002 |
| 2020/0027251 A1 * | 1/2020 | Demesmaeker ...... | G06T 11/006 |
| 2022/0130520 A1 * | 4/2022 | Xia ........................ | G16H 30/40 |
| 2023/0274436 A1 * | 8/2023 | Wang ...................... | G06T 7/10 |
| | | | 382/128 |

OTHER PUBLICATIONS

Moorthy, "Blind image quality assessment: From natural scene statistics to perceptual quality," IEEE Trans. Image Process., vol. 20, No. 12, pp. 3350-3364, Dec. 2011 (Year: 2011).*
Narwaria, "Objective image quality assessment based on support vector regression," IEEE Trans. Neural Netw., vol. 21, No. 3, pp. 515-519, Mar. 2010. (Year: 2010).*

(Continued)

*Primary Examiner* — Juan A Torres

(57) ABSTRACT

Systems and methods for automatically determining an image quality assessment of a rendered medical image are provided. A rendered medical image is received. One or more measures of interest are extracted from the rendered medical image. An image quality assessment of the rendered medical image is determined using a machine learning based image quality assessment network based on the one or more measures of interest. The image quality assessment of the rendered medical image is output.

17 Claims, 6 Drawing Sheets

(56) References Cited

OTHER PUBLICATIONS

Narwaria, "SVD-based quality metric for image and video using machine learning," IEEE Trans. Syst., Man, Cybern., B, Cybern., vol. 42, No. 2, pp. 347-364, Apr. 2012. (Year: 2012).*

European search opinion dated Apr. 25, 2023 (Year: 2023).*

Treder Matthias S et al: "Quality assessment of anatomical MRI images from generative adversarial networks: Human assessment and image quality metrics", Journal of Neuroscience Methods, Elsevier Science Publisher B.V., Amsterdam, NL, vol. 374, Mar. 29, 2022 (Mar. 29, 2022), XP087019640, ISSN: 0165-0270, DOI: 10.1016/J.JNEUMETH.2022.109579.

Huang Bangyan et al: "MRI super-resolution via realistic downsampling with adversarial learning", Physics in Medicine and Biology, vol. 66, No. 20, Oct. 21, 2021 (Oct. 21, 2021), p. 205004, XP093039554, Bristol GB, ISSN: 0031-9155, DOI: 10.1088/1361-6560/ac232e, Retrieved from the Internet:URL:https://iopscience.iop.org/article/10.1088/1361-6560/ac232e/pdf.

Extemded European Search Report (EESR) mailed Apr. 25, 2023 in corresponding European Patent Application No. 23159846.7.

Engel, "Real-time Monte-Carlo path tracing of medical volume data." 2016, In GPU Technology Conference, 50 pgs.

Laina et al., "Deeper Depth Prediction with Fully Convolutional Residual Networks," 2016, 2016 Fourth International Conference on 3D Vision (3DV), pp. 239-248.

Chow et al., "Review of medical image quality assessment," 2016, Biomedical Signal Processing and Control vol. 27, pp. 145-154.

Zhai et al., "Perceptual image quality assessment: a survey," 2020, Science China Information Sciences, vol. 63, Issue 11, pp. 1-52.

Mittal et al., "No-Reference Image Quality Assessment in the Spatial Domain," 2012, IEEE Transactions on Image Processing, vol. 21, No. 12, pp. 4695-4708.

Chow et al., "Modified-BRISQUE as no reference image quality assessment for structural MR images," 2017, Magnetic Resonance Imaging, vol. 43, pp. 74-87.

Wang et al., "Lighting System for Visual Perception Enhancement in Volume Rendering," 2013, IEEE Transactions on Visualization and Computer Graphics, vol. 19, No. 1, pp. 67-80.

Loper et al., "OpenDR: An Approximate Differentiable Renderer," 2014, 2014, Computer Vision—ECCV 2014, Lecture Notes in Computer Science, vol. 8695, pp. 154-169.

* cited by examiner

IMAGE QUALITY ASSESSMENT FOR REFINEMENT OF IMAGING RENDERING PARAMETERS FOR RENDERING MEDICAL IMAGES

TECHNICAL FIELD

The present invention relates generally to image quality assessment, and in particular to image quality assessment for refinement of imaging rendering parameter for rendering medical images.

BACKGROUND

Image quality assessment plays an important role in machine learning, medical imaging, computer vision, image compression, etc. Although a vast number of techniques exists to assess the image quality of 2D (two-dimensional) medical images, there has been little research performed for assessing the image quality of 3D (three-dimensional) medical images in a systematic and clinically meaningful way. The assessment of 3D medical images remains a subjective, mostly manual, and computationally expensive process.

BRIEF SUMMARY OF THE INVENTION

In accordance with one or more embodiments, systems and methods for automatically determining an image quality assessment of a rendered medical image are provided. A rendered medical image is received. One or more measures of interest are extracted from the rendered medical image. An image quality assessment of the rendered medical image is determined using a machine learning based image quality assessment network based on the one or more measures of interest. The image quality assessment of the rendered medical image is output.

In one embodiment, an input depth map of the rendered medical image is received. An estimated depth map is generated from the rendered medical image. The input depth map is compared with the estimated depth map. The image quality assessment of the rendered medical image is further determined based on results of the comparison.

In one embodiment, the image quality assessment is compared with a threshold. In response to determining that the image quality assessment does not satisfy the threshold, imaging rendering parameters from which the rendered medical image was rendered are modified. In response to determining that the image quality assessment does not satisfy the threshold, an updated rendered medical image is generated based on the modified imaging rendering parameters and the extracting, the determining, and the modifying are repeated using the updated rendered medical image as the rendered medical image until the image quality assessment satisfies a threshold. In response to determining that the image quality assessment satisfies the threshold, the machine learning based image quality assessment network is retrained based on the rendered medical image and the image quality assessment and the imaging rendering parameters are stored in memory.

In one embodiment, the one or more measures of interest comprise natural scene statistics.

These and other advantages of the invention will be apparent to those of ordinary skill in the art by reference to the following detailed description and the accompanying drawings.

DETAILED DESCRIPTION

The present invention generally relates to methods and systems for image quality assessment for refinement of imaging rendering parameters for rendering medical images. Embodiments of the present invention are described herein to give a visual understanding of such methods and systems. A digital image (such as, e.g., a medical image) is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for automatic image quality assessment of rendered medical images using a machine learning based image quality assessment network. The image quality assessment may be performed based on measurements of depth perception of the rendered medical images and/or measures of interest extracted from the rendered medical images. The image quality assessment network automatically evaluates the image quality of the rendered medical images not only for assessing the perceptual photorealistic appearance of the rendered medical images, but also for assessing the clinically meaningful features represented in the rendered medical images. Advantageously, such image quality assessment in accordance with embodiments described herein may be utilized for automatic or semi-automatic refinement of the imaging rendering parameters and generation of clinical presets of the imaging rendering parameters for generating rendered medical images for various clinical use cases and imaging modalities.

Figure 1:
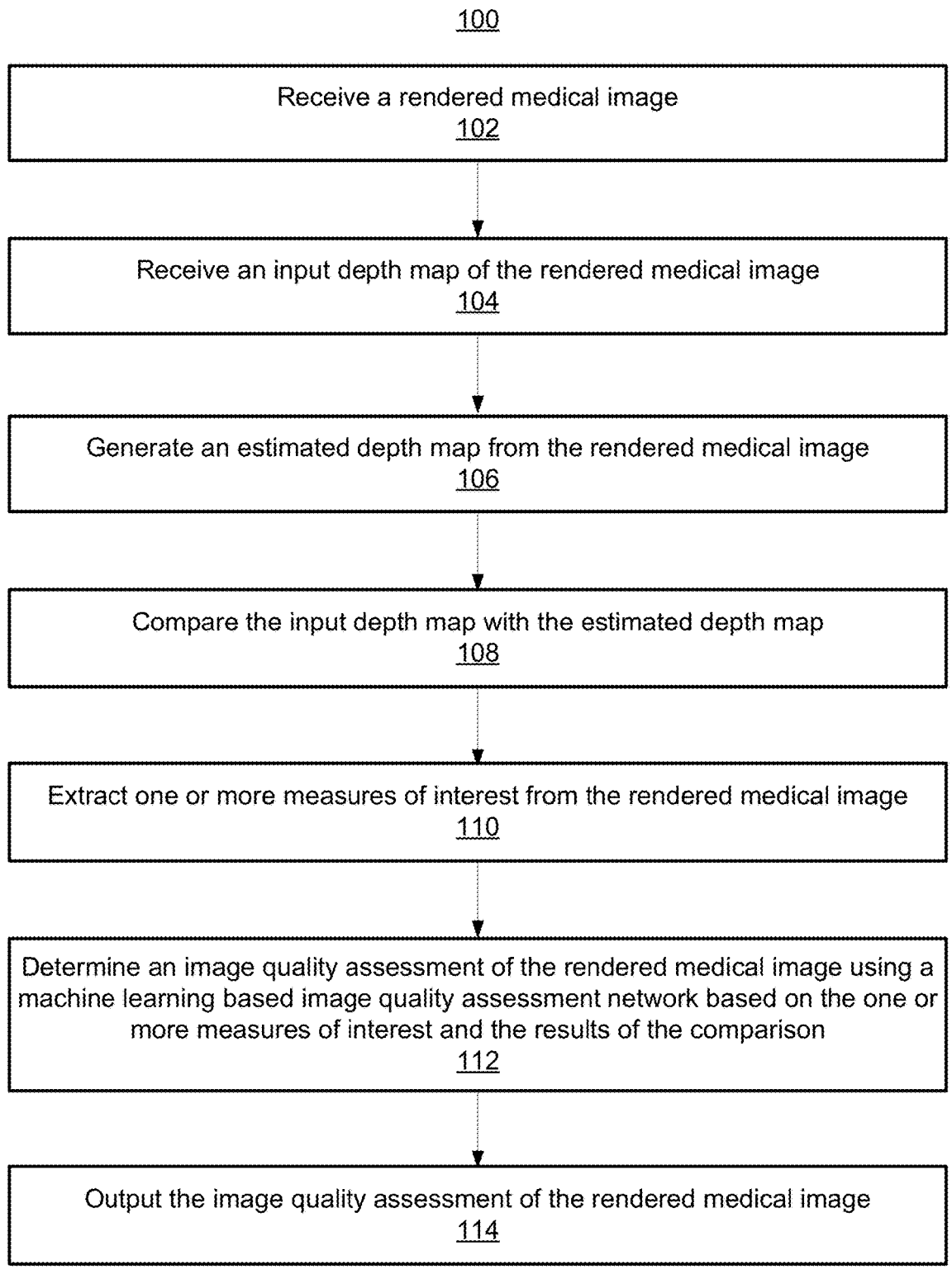
FIG. 1 shows a method for image quality assessment of a rendered medical image, in accordance with one or more embodiments.
Figure 2:
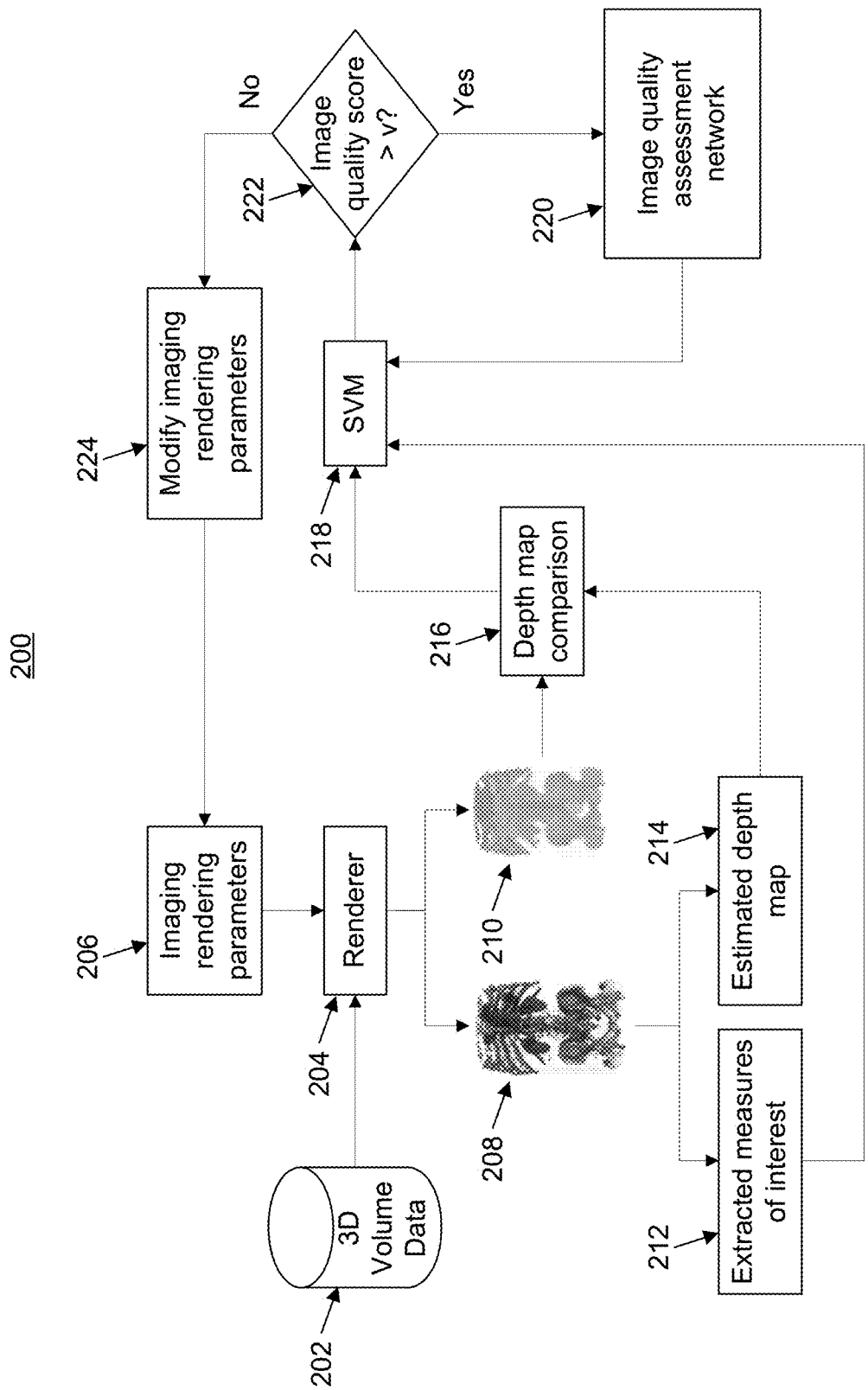
FIG. 2 shows a workflow for image quality assessment of a rendered medical image, in accordance with one or more embodiments.

FIG. 1 shows a method 100 for image quality assessment of a rendered medical image, in accordance with one or more embodiments. The steps of method 100 may be performed by one or more suitable computing devices, such as, e.g., computer 602 of FIG. 6. FIG. 2 shows a workflow 200 for image quality assessment of a rendered medical image, in accordance with one or more embodiments. FIG. 1 and FIG. 2 will be described together.

At step 102 of FIG. 1, a rendered medical image is received. In one example, as shown in FIG. 2, the rendered medical image is rendered medical image 208 in workflow 200. Rendered medical image 208 may have been generated by renderer 204 from 3D (three-dimensional) volumetric data 202 based on imaging rendering parameters 206 by applying any suitable image rendering algorithm. Imaging rendering parameters 206 may initially be predefined imaging rendering parameters or user defined imaging rendering parameters. Exemplary imaging rendering parameters 206 include different transfer functions and window/level values (that map intensity and opacity values of the volumetric data into presets for different tissue type), exposure of light, aperture of the virtual camera, etc. The image rendering algorithm may be, for example, a standard ray casting algorithm with simple shading (e.g., Phong shading), a ray casting algorithm with real-time approximate global illumination, a cinematic renderer applying a path tracer (e.g., Monte Carlo path tracer) that generates images by simulating the physics of light along light paths for each pixel, or any other suitable image rendering algorithm. The rendered medical image 208 may be rendered using any other suitable approach.

The rendered medical image 208 may be of any suitable modality, such as, e.g., CT (computed tomography), dynaCT, MRI (magnetic resonance imaging), ultrasound, x-ray, or any other medical imaging modality or combinations of medical imaging modalities. The rendered medical image 208 may be a 2D (two-dimensional) image that can represent 2D instances and/or one or more 3D volumes, and may comprise a single rendered medical image or a plurality of rendered medical images. The rendered medical image 208 may be received by loading a previously generated rendered image from a storage or memory of a computer system or receiving a rendered medical image that has been transmitted from a remote computer system.

At step 104 of FIG. 1, an input depth map of the rendered medical image is received. For example, as shown in FIG. 2, the input depth map is input depth map 210 in workflow 200. A depth map is a pixelwise heat map having pixels corresponding to pixels of, e.g., the rendered medical image, where each respective pixel of the depth map has an intensity value ranging from, e.g., 0 to 1 representing a depth depicted by that respective pixel. In one embodiment, the input depth map 210 may have been generated by the renderer 204 as part of the rendering of the rendered medical image 208 from the 3D volumetric data 202 based on the imaging rendering parameters 206. The input depth map 210 represents the depth that the rendered medical image 208 should depict.

At step 106 of FIG. 1, an estimated depth map is generated from the rendered medical image. For example, as shown in FIG. 2, the estimated depth map may be estimated depth map 214 of workflow 200. In one embodiment, the estimated depth map 214 is generated using a machine learning depth estimation network (e.g., a convolutional neural network) trained using residual learning. The estimated depth map 214 may be generated according to any other suitable approach. The estimated depth map 214 represents the depth that the rendered medical image 208 actually depicts.

At step 108 of FIG. 1, the input depth map and the estimated depth map are compared. For example, as shown in FIG. 2, the input depth map 210 and the estimated depth map 214 are compared at block 216 of workflow 200. As the input depth map 210 represents the depth that the rendered medical image 208 should depict and the estimated depth map 214 represents the depth that the rendered medical image 208 actually depicts, by comparing the input depth map 210 and the estimated depth map 214, an assessment of the depth perception of the rendered medical image 208 is determined.

The comparison may be performed according to any suitable approach. For example, the comparison may be performed by comparing the intensity of each corresponding pixel in the input depth map 210 and the estimated depth map 214, by comparing a mean intensity for windows of a predetermined size (e.g., 5×5 pixels), or by any other suitable approach. The results of the comparison may be in the form of a depth score or in any other suitable format.

At step 110 of FIG. 1, one or more measures of interest are extracted from the rendered medical image. For example, as shown in FIG. 2, the measures of interest may be extracted measures of interest 212 of workflow 200. The extracted measures of interest 212 may be any metric or metrics relating to the image quality of the rendered medical image.

In one embodiment, the extracted measures of interest 212 are natural scene statistics. Natural scene statistics modeling assumes that natural images have regular statistical properties that play an important role in human perception. Image distortions cause images to deviate from these natural scene statistics. One example of a natural scene statistic includes locally normalized luminance coefficients to describe the "naturalness" of an image and/or the presence of distortions.

In one embodiment, the one or more measures of interest 212 may be extracted from the rendered medical image via photogrammetry and such extracted measures of interest may be compared with their corresponding measurements from the 3D volume data from which the rendered medical image was rendered. Examples of such measures of interest 212 may include distances between automatically detected features (e.g., important anatomical landmarks, markers, annotations, etc.), iso-surfaces (i.e., extracted regions of a volume having common data values, such as, e.g., lesions, the surface of an organ, etc.) derived from the rendered medical image and compared with computed iso-surfaces, etc.

At step 112 of FIG. 1, an image quality assessment of the rendered medical image is determined using a machine learning based image quality assessment network based on the one or more measures of interest and results of the comparison of the input depth map and the estimated depth map. The image quality assessment may be represented in any suitable format, such as, e.g., a classification, a score, etc. For example, as shown in FIG. 2, the image quality assessment may be determined by SVM (support vector machine) 218 using image quality assessment network 220 to generate an image quality score in workflow 200. SVM 218 receives the one or more measures of interest 212 and the results of the comparison 216 as input and generates an image quality score as output using image quality assessment network 220. Image quality assessment network 220 helps detect (e.g., classify) if an image is distorted and, if so, what kind of distortion. The image quality score represents the image quality of the rendered medical image.

In one embodiment, the image quality assessment network 220 may be implemented as a regression model to map the one or more measures of interest 212 and the results of the comparison 216 to the image quality score. However, the image quality assessment network may be implemented using any other suitable machine learning based architecture. The image quality assessment network is initially trained during a prior offline or training stage using a set of training data, as described in further detail below with respect to FIG. 3. Once trained, the trained image quality assessment network 220 is applied during an online or inference stage, for example, to determine an image quality assessment of the rendered medical image by at step 112 of FIG. 1 or by SVM 218 in FIG. 2.

At step 114 of FIG. 1, the image quality assessment of the rendered medical image is output. For example, the image quality assessment of the rendered medical image can be output by displaying the image quality assessment on a display device of a computer system, storing the image quality assessment on a memory or storage of a computer system, or by transmitting the image quality assessment to a remote computer system.

In one embodiment, the image quality assessment determined in method 100 may be utilized for imaging rendering parameter refinement using continuous learning. For example, as shown in FIG. 2, the image quality score output by SVM 218 is compared with a predefined threshold v at comparison block 222. The image quality score satisfying (e.g., is greater than) the threshold v indicates relatively high image quality while the image quality score not satisfying (e.g., is not greater than) the threshold v indicates relatively low image quality. In response to the image quality score not satisfying the threshold v, the imaging rendering parameters 206 are modified at block 224. For example, the imaging rendering parameters 206 may be modified by a clinician or other user. Workflow 200 may then be repeated for one or more additional iterations using the modified imaging rendering parameters to generate updated rendered medical image 208 and updated input depth map 210 by renderer 204 until the image quality score satisfies the threshold v at comparison block 222 (or any other stopping condition is satisfied, such as, e.g., a predetermined number of iterations is performed). In other words, with respect to method 100 of FIG. 1, an updated rendered medical image and an updated input depth map may be generated using the modified imaging rendering parameters and method 100 may be repeated any number of iterations using the updated rendered medical image as the rendered medical image received at step 102 and the updated input depth map as the input depth map received at step 104. In response to the image quality score satisfying the threshold v, the rendered medical image 208, input depth map 210, and the image quality score are added to the set of training data for retraining the image quality assessment network 220. In this way, the image quality assessment network 220 is continually improved and the renderer 204 is fine-tuned by optimizing parameters to generate rendered medical images that are not only photorealistic in appearance, but also clinically relevant.

In one embodiment, in response to the image quality score satisfying the threshold v at comparison block 222, the imaging rendering parameters 206 may be stored in memory as a clinical preset. The imaging rendering parameters 206 may be stored in response to user input and associated with a clinical application (e.g., a particular clinical procedure or use case, such as stent placements, aortic valve guidance, etc.) and/or a particular image modality of the rendered medical image. The user may then retrieve the imaging rendering parameters 206 from the memory when encountering the clinical application. The clinical presets of imaging rendering parameters may be customized for a hospital site or institution based on the set of training data and the user input.

In one embodiment, the image quality assessment network may be utilized for other applications. For example, the image quality assessment network may be utilized in software development tools for automatic testing and evaluating new algorithms or features. In another example, the image quality score generated by the image quality assessment network may be incorporated into the loss function of artificial intelligence based algorithms (e.g., image denoising) or into a differentiable renderer.

Figure 3:
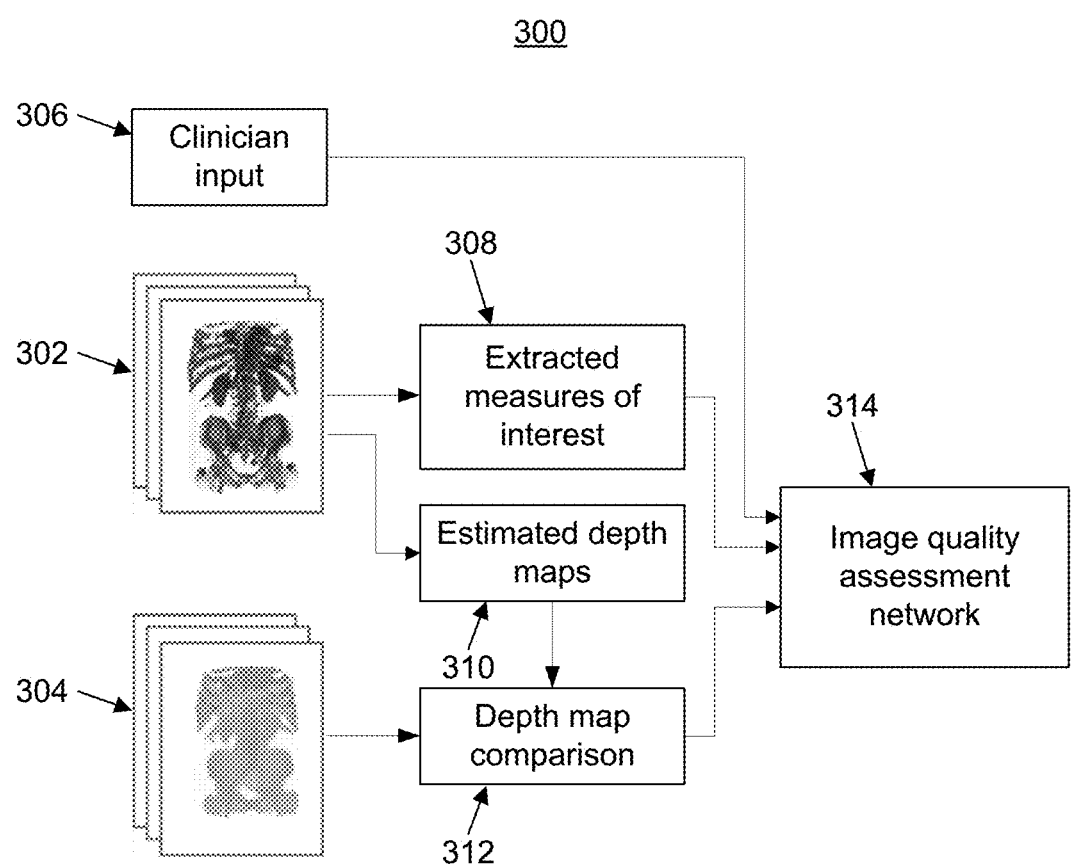
FIG. 3 shows a workflow for training a machine learning based image quality assessment network for determining an image quality assessment of a rendered medical image, in accordance with one or more embodiments.

FIG. 3 shows a workflow 300 for training a machine learning based image quality assessment network for determining an image quality assessment of a rendered medical image, in accordance with one or more embodiments. For example, workflow 300 may be applied to train the image quality assessment network utilized at step 112 of FIG. 1 or image quality assessment network 220 of FIG. 2.

Workflow 300 is performed during a prior offline or training stage to train the image quality assessment network using a set of training data. The set of training data comprises training rendered medical images 302 with corresponding training input depth maps 304 and clinician input 306 of an image quality assessment of the training rendered medical images 302. The clinician input 306 may be received from one or more clinicians, medical professionals, or any other suitable user or users. In one embodiment, the clinician input 306 comprises an image quality score representing the opinion of the image quality of the training rendered medical images 302 from one or more users. Where the clinician input 306 is determined from a plurality of users, the image quality score may be calculated as a mean image quality score of the plurality of clinicians.

Estimated depth maps 310 are generated from the training rendered medical image 302, for example, as described with respect to step 106 of FIG. 1 and the training input depth maps 304 and the estimated depth maps 310 are compared. One or more measures of interest 308 are extracted from training rendered medical images 302, for example, as described with respect to step 110 of FIG. 1. Image quality assessment network 314 is then trained to map extracted measures of interest 308 and results of the depth map comparison 312 to the image quality assessment (e.g., image quality score) as defined by clinician input 306. Once trained, the trained image quality assessment network 314 is applied during an online or inference stage, for example, to determine an image quality assessment of the rendered medical image at step 112 of FIG. 1 and/or as image quality assessment network 220 of FIG. 2.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 4:
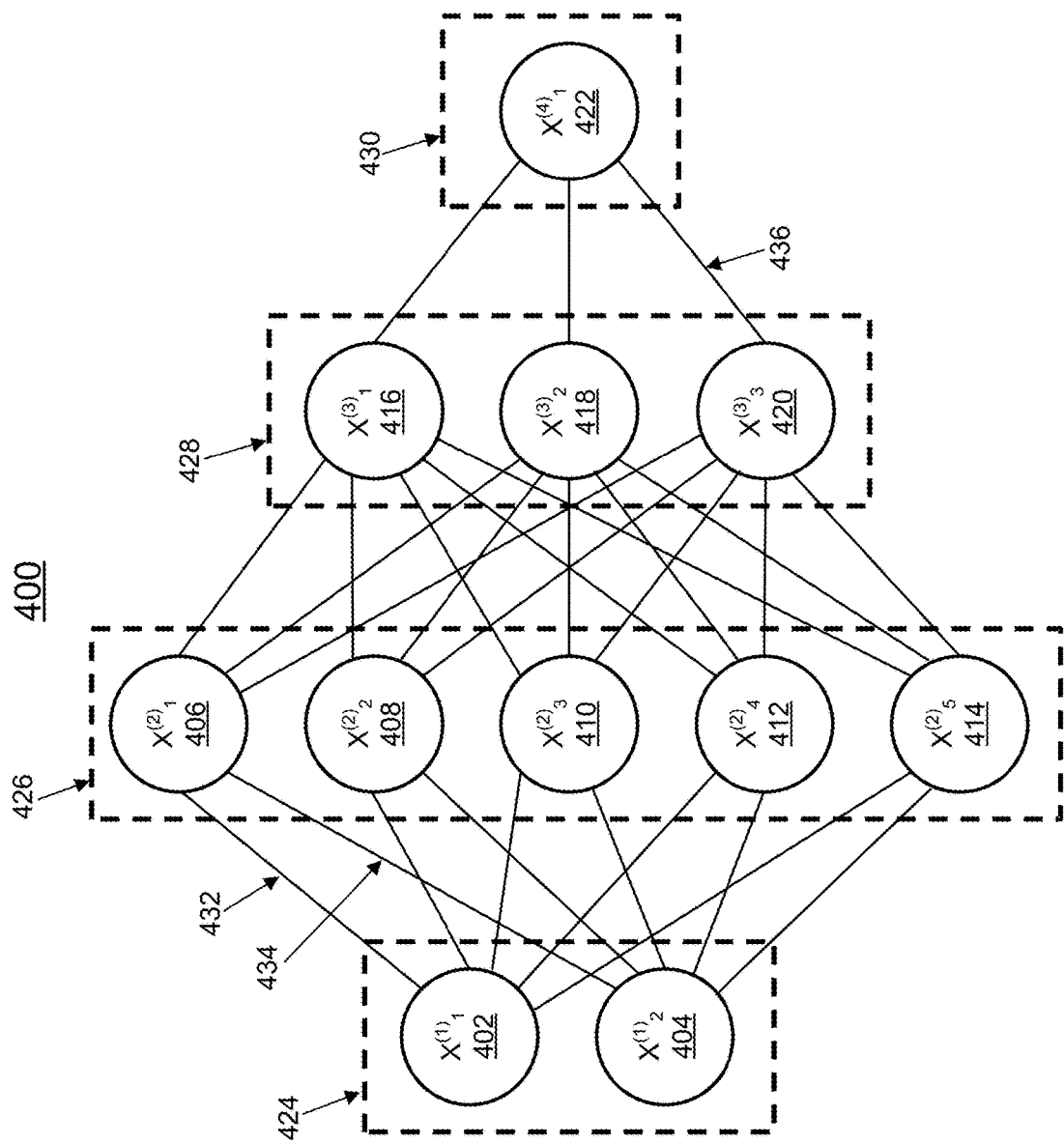
FIG. 4 shows an exemplary artificial neural network that may be used to implement one or more embodiments.

FIG. 4 shows an embodiment of an artificial neural network 400, in accordance with one or more embodiments. Alternative terms for "artificial neural network" are "neural network", "artificial neural net" or "neural net". Machine learning networks described herein, such as, e.g., the depth estimation network utilized at step 108 and the image quality assessment network utilized at step 114 of FIG. 1, the SVM 218 or the image quality assessment network 220 of FIG. 2, or the image equality assessment network 314 of FIG. 3, may be implemented using artificial neural network 400.

The artificial neural network 400 comprises nodes 402-422 and edges 432, 434, ..., 436, wherein each edge 432, 434, ..., 436 is a directed connection from a first node 402-422 to a second node 402-422. In general, the first node 402-422 and the second node 402-422 are different nodes 402-422, it is also possible that the first node 402-422 and the second node 402-422 are identical. For example, in FIG. 4, the edge 432 is a directed connection from the node 402 to the node 406, and the edge 434 is a directed connection from the node 404 to the node 406. An edge 432, 434, ..., 436 from a first node 402-422 to a second node 402-422 is also denoted as "ingoing edge" for the second node 402-422 and as "outgoing edge" for the first node 402-422.

In this embodiment, the nodes 402-422 of the artificial neural network 400 can be arranged in layers 424-430, wherein the layers can comprise an intrinsic order introduced by the edges 432, 434, ..., 436 between the nodes 402-422. In particular, edges 432, 434, ..., 436 can exist only between neighboring layers of nodes. In the embodiment shown in FIG. 4, there is an input layer 424 comprising only nodes 402 and 404 without an incoming edge, an output layer 430 comprising only node 422 without outgoing edges, and hidden layers 426, 428 in-between the input layer 424 and the output layer 430. In general, the number of hidden layers 426, 428 can be chosen arbitrarily. The number of nodes 402 and 404 within the input layer 424 usually relates to the number of input values of the neural network 400, and the number of nodes 422 within the output layer 430 usually relates to the number of output values of the neural network 400.

In particular, a (real) number can be assigned as a value to every node 402-422 of the neural network 400. Here, $x^{(n)}_i$ denotes the value of the i-th node 402-422 of the n-th layer 424-430. The values of the nodes 402-422 of the input layer 424 are equivalent to the input values of the neural network 400, the value of the node 422 of the output layer 430 is equivalent to the output value of the neural network 400. Furthermore, each edge 432, 434, ..., 436 can comprise a weight being a real number, in particular, the weight is a real number within the interval [−1, 1] or within the interval [0, 1]. Here, $w^{(m,n)}_{i,j}$ denotes the weight of the edge between the i-th node 402-422 of the m-th layer 424-430 and the j-th node 402-422 of the n-th layer 424-430. Furthermore, the abbreviation $w^{(n)}_{i,j}$ is defined for the weight $w^{(n,n+1)}_{i,j}$.

In particular, to calculate the output values of the neural network 400, the input values are propagated through the neural network. In particular, the values of the nodes 402-422 of the (n+1)-th layer 424-430 can be calculated based on the values of the nodes 402-422 of the n-th layer 424-430 by $$x^{(n+1)}_j = f(\Sigma_i x^{(n)}_i \cdot w^{(n)}_{i,j}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 424 are given by the input of the neural network 400, wherein values of the first hidden layer 426 can be calculated based on the values of the input layer 424 of the neural network, wherein values of the second hidden layer 428 can be calculated based in the values of the first hidden layer 426, etc.

In order to set the values $w^{(m,n)}_{i,j}$ for the edges, the neural network 400 has to be trained using training data. In particular, training data comprises training input data and training output data (denoted as $t_i$). For a training step, the neural network 400 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 400 (backpropagation algorithm). In particular, the weights are changed according to $$w'^{(n)}_{i,j} = w^{(n)}_{i,j} - \gamma \cdot \delta^{(n)}_j \cdot x^{(n)}_i$$

wherein $\gamma$ is a learning rate, and the numbers $\delta^{(n)}_j$ can be recursively calculated as $$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t^{(n+1)}_j) \cdot f'(\Sigma_i x^{(n)}_i \cdot w^{(n)}_{i,j})$$

if the (n+1)-th layer is the output layer 430, wherein f' is the first derivative of the activation function, and $y^{(n+1)}_j$ is the comparison training value for the j-th node of the output layer 430.

Figure 5:
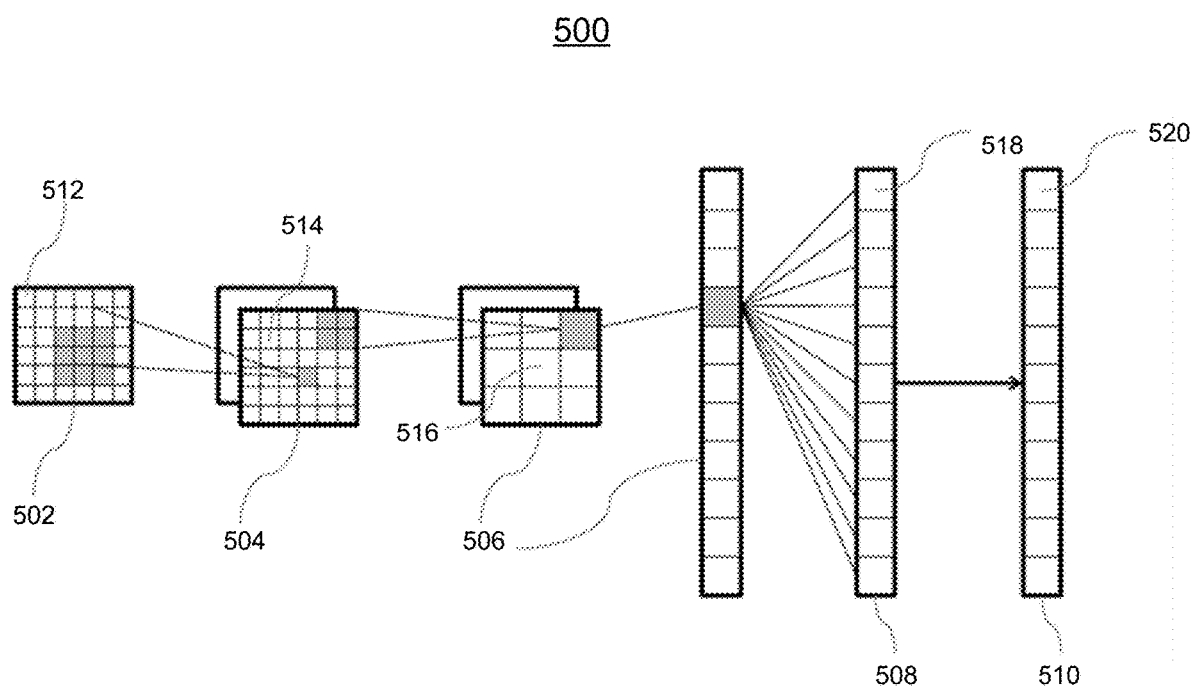
FIG. 5 shows a convolutional neural network that may be used to implement one or more embodiments.

FIG. 5 shows a convolutional neural network 500, in accordance with one or more embodiments. Machine learning networks described herein, such as, e.g., the depth estimation network utilized at step 108 and the image quality assessment network utilized at step 114 of FIG. 1, the SVM 218 or the image quality assessment network 220 of FIG. 2, or the image equality assessment network 314 of FIG. 3, may be implemented using convolutional neural network 500.

In the embodiment shown in FIG. 5, the convolutional neural network comprises 500 an input layer 502, a convolutional layer 504, a pooling layer 506, a fully connected layer 508, and an output layer 510. Alternatively, the convolutional neural network 500 can comprise several convolutional layers 504, several pooling layers 506, and several fully connected layers 508, as well as other types of layers. The order of the layers can be chosen arbitrarily, usually fully connected layers 508 are used as the last layers before the output layer 510.

In particular, within a convolutional neural network 500, the nodes 512-520 of one layer 502-510 can be considered to be arranged as a d-dimensional matrix or as a d-dimensional image. In particular, in the two-dimensional case the value of the node 512-520 indexed with i and j in the n-th layer 502-510 can be denoted as $x^{(n)}_{[i,j]}$. However, the arrangement of the nodes 512-520 of one layer 502-510 does not have an effect on the calculations executed within the convolutional neural network 500 as such, since these are given solely by the structure and the weights of the edges.

In particular, a convolutional layer 504 is characterized by the structure and the weights of the incoming edges forming a convolution operation based on a certain number of kernels. In particular, the structure and the weights of the incoming edges are chosen such that the values $x^{(n)}_k$ of the nodes 514 of the convolutional layer 504 are calculated as a convolution $x^{(n)}_k = K_k * x^{(n-1)}$ based on the values $x^{(n-1)}$ of the nodes 512 of the preceding layer 502, where the convolution * is defined in the two-dimensional case as $$x^{(n)}_k[i,j] = (K_k * x^{(n-1)})[i,j] = \sum_i \sum_j K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 512-518 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 512-520 in the respective layer 502-510. In particular, for a convolutional layer 504, the number of nodes 514 in the convolutional layer is equivalent to the number of nodes 512 in the preceding layer 502 multiplied with the number of kernels.

If the nodes 512 of the preceding layer 502 are arranged as a d-dimensional matrix, using a plurality of kernels can be interpreted as adding a further dimension (denoted as "depth" dimension), so that the nodes 514 of the convolutional layer 504 are arranged as a (d+1)-dimensional matrix. If the nodes 512 of the preceding layer 502 are already arranged as a (d+1)-dimensional matrix comprising a depth dimension, using a plurality of kernels can be interpreted as expanding along the depth dimension, so that the nodes 514 of the convolutional layer 504 are arranged also as a (d+1)-dimensional matrix, wherein the size of the (d+1)-dimensional matrix with respect to the depth dimension is by a factor of the number of kernels larger than in the preceding layer 502.

The advantage of using convolutional layers 504 is that spatially local correlation of the input data can exploited by enforcing a local connectivity pattern between nodes of adjacent layers, in particular by each node being connected to only a small region of the nodes of the preceding layer.

In embodiment shown in FIG. 5, the input layer 502 comprises 36 nodes 512, arranged as a two-dimensional 6×6 matrix. The convolutional layer 504 comprises 72 nodes 514, arranged as two two-dimensional 6×6 matrices, each of the two matrices being the result of a convolution of the values of the input layer with a kernel. Equivalently, the nodes 514 of the convolutional layer 504 can be interpreted as arranges as a three-dimensional 6×6×2 matrix, wherein the last dimension is the depth dimension.

A pooling layer 506 can be characterized by the structure and the weights of the incoming edges and the activation function of its nodes 516 forming a pooling operation based on a non-linear pooling function f. For example, in the two dimensional case the values $x^{(n)}$ of the nodes 516 of the pooling layer 506 can be calculated based on the values $x^{(n-1)}$ of the nodes 514 of the preceding layer 504 as $$x^{(n)}[i,j] = f(x^{(n-1)}[id_1, jd_2], \ldots, x^{(n-1)}[id_1+d_1-1, jd_2+d_2-1])$$

In other words, by using a pooling layer 506, the number of nodes 514, 516 can be reduced, by replacing a number $d_1 \cdot d_2$ of neighboring nodes 514 in the preceding layer 504 with a single node 516 being calculated as a function of the values of said number of neighboring nodes in the pooling layer. In particular, the pooling function f can be the max-function, the average or the L2–Norm. In particular, for a pooling layer 506 the weights of the incoming edges are fixed and are not modified by training.

The advantage of using a pooling layer 506 is that the number of nodes 514, 516 and the number of parameters is reduced. This leads to the amount of computation in the network being reduced and to a control of overfitting.

In the embodiment shown in FIG. 5, the pooling layer 506 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 508 can be characterized by the fact that a majority, in particular, all edges between nodes 516 of the previous layer 506 and the nodes 518 of the fully-connected layer 508 are present, and wherein the weight of each of the edges can be adjusted individually.

In this embodiment, the nodes 516 of the preceding layer 506 of the fully-connected layer 508 are displayed both as two-dimensional matrices, and additionally as non-related nodes (indicated as a line of nodes, wherein the number of nodes was reduced for a better presentability). In this embodiment, the number of nodes 518 in the fully connected layer 508 is equal to the number of nodes 516 in the preceding layer 506. Alternatively, the number of nodes 516, 518 can differ.

Furthermore, in this embodiment, the values of the nodes 520 of the output layer 510 are determined by applying the Softmax function onto the values of the nodes 518 of the preceding layer 508. By applying the Softmax function, the sum the values of all nodes 520 of the output layer 510 is 1, and all values of all nodes 520 of the output layer are real numbers between 0 and 1.

A convolutional neural network 500 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 500 can be trained based on the backpropagation algorithm. For preventing overfitting, methods of regularization can be used, e.g. dropout of nodes 512-520, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-3. Certain steps or functions of the methods and workflows described herein, including one or more of the steps or functions of FIGS. 1-3, may be performed by a server or by another processor in a network-based cloud-computing system. Certain steps or functions of the methods and workflows described herein, including one or more of the steps of FIGS. 1-3, may be performed by a client computer in a network-based cloud computing system. The steps or functions of the methods and workflows described herein, including one or more of the steps of FIGS. 1-3, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
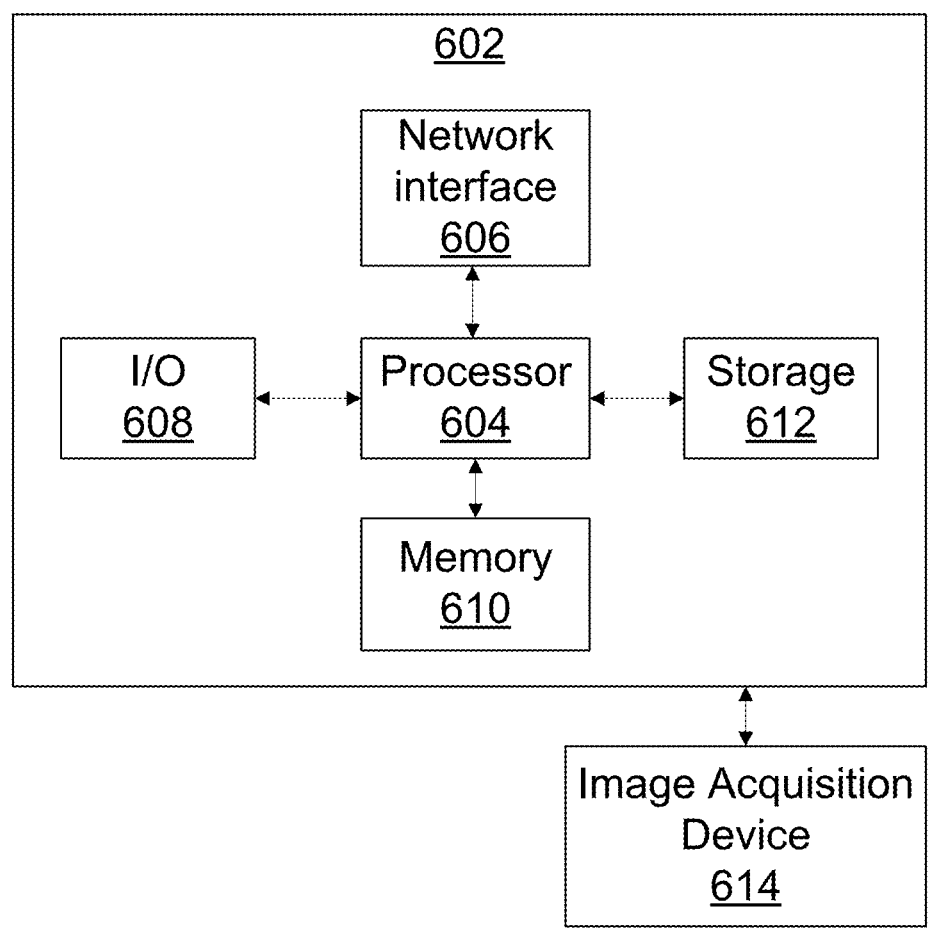
FIG. 6 shows a high-level block diagram of a computer that may be used to implement one or more embodiments.

A high-level block diagram of an example computer 602 that may be used to implement systems, apparatus, and methods described herein is depicted in FIG. 6. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 1-3 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 1-3. Accordingly, by executing the computer program instructions, the processor 604 executes the method and workflow steps or functions of FIGS. 1-3. Computer 602 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

An image acquisition device 614 can be connected to the computer 602 to input image data (e.g., medical images) to the computer 602. It is possible to implement the image acquisition device 614 and the computer 602 as one device. It is also possible that the image acquisition device 614 and the computer 602 communicate wirelessly through a network. In a possible embodiment, the computer 602 can be located remotely with respect to the image acquisition device 614.

Any or all of the systems and apparatus discussed herein may be implemented using one or more computers such as computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method, comprising:
    receiving a rendered medical image and an input depth map of the rendered medical image;
    generating an estimated depth map from the rendered medical image;
    comparing the input depth map with the estimated depth map;
    extracting one or more measures of interest from the rendered medical image;
    determining an image quality assessment of the rendered medical image using a machine learning based image quality assessment network based on the one or more measures of interest and results of the comparison; and
    outputting the image quality assessment of the rendered medical image.

2. The computer-implemented method of claim 1, further comprising:
    comparing the image quality assessment with a threshold; and
    in response to determining that the image quality assessment does not satisfy the threshold, modifying imaging rendering parameters from which the rendered medical image was rendered.

3. The computer-implemented method of claim 2, further comprising:
    in response to determining that the image quality assessment does not satisfy the threshold:
        generating an updated rendered medical image based on the modified imaging rendering parameters; and
        repeating the extracting, the determining, and the modifying using the updated rendered medical image as the rendered medical image until the image quality assessment satisfies a threshold.

4. The computer-implemented method of claim 2, further comprising:
    in response to determining that the image quality assessment satisfies the threshold, retraining the machine learning based image quality assessment network based on the rendered medical image and the image quality assessment.

5. The computer-implemented method of claim 2, further comprising:
    in response to determining that the image quality assessment satisfies the threshold, storing the imaging rendering parameters in memory.

6. The computer-implemented method of claim 1, wherein the one or more measures of interest comprise natural scene statistics.

7. An apparatus, comprising:
    means for receiving a rendered medical image and an input depth map of the rendered medical image;
    means for generating an estimated depth map from the rendered medical image;
    means for comparing the input depth map with the estimated depth map;
    means for extracting one or more measures of interest from the rendered medical image;
    means for determining an image quality assessment of the rendered medical image using a machine learning based image quality assessment network based on the one or more measures of interest and results of the comparison; and
    means for outputting the image quality assessment of the rendered medical image.

8. The apparatus of claim 7, further comprising:
    means for comparing the image quality assessment with a threshold; and
    means for modifying imaging rendering parameters from which the rendered medical image was rendered in response to determining that the image quality assessment does not satisfy the threshold.

9. The apparatus of claim 8, further comprising:
    in response to determining that the image quality assessment does not satisfy the threshold:
        means for generating an updated rendered medical image based on the modified imaging rendering parameters; and
        means for repeating the extracting, the determining, and the modifying using the updated rendered medical image as the rendered medical image until the image quality assessment satisfies a threshold.

10. The apparatus of claim 8, further comprising:
means for retraining the machine learning based image quality assessment network based on the rendered medical image and the image quality assessment in response to determining that the image quality assessment satisfies the threshold.

11. The apparatus of claim 8, further comprising:
means for storing the imaging rendering parameters in memory in response to determining that the image quality assessment satisfies the threshold.

12. The apparatus of claim 7, wherein the one or more measures of interest comprise natural scene statistics.

13. A non-transitory computer readable medium storing computer program instructions, the computer program instructions when executed by a processor cause the processor to perform operations comprising:
receiving a rendered medical image and an input depth map of the rendered medical image;
generating an estimated depth map from the rendered medical image;
comparing the input depth map with the estimated depth map;
extracting one or more measures of interest from the rendered medical image;
determining an image quality assessment of the rendered medical image using a machine learning based image quality assessment network based on the one or more measures of interest and results of the comparison; and
outputting the image quality assessment of the rendered medical image.

14. The non-transitory computer readable medium of claim 13, the operations further comprising:
comparing the image quality assessment with a threshold; and
in response to determining that the image quality assessment does not satisfy the threshold, modifying imaging rendering parameters from which the rendered medical image was rendered.

15. The non-transitory computer readable medium of claim 14, the operations further comprising:
in response to determining that the image quality assessment does not satisfy the threshold:
generating an updated rendered medical image based on the modified imaging rendering parameters; and
repeating the extracting, the determining, and the modifying using the updated rendered medical image as the rendered medical image until the image quality assessment satisfies a threshold.

16. The non-transitory computer readable medium of claim 14, the operations further comprising:
in response to determining that the image quality assessment satisfies the threshold, retraining the machine learning based image quality assessment network based on the rendered medical image and the image quality assessment.

17. The non-transitory computer readable medium of claim 14, the operations further comprising:
in response to determining that the image quality assessment satisfies the threshold, storing the imaging rendering parameters in memory.

* * * * *